United States Patent

[11] 3,581,428

[72] Inventor Warren W. Helder
R.D. 1, Wrightsville, Pa. 17368
[21] Appl. No. 810,511
[22] Filed Mar. 26, 1969
[45] Patented June 1, 1971

[54] FISHING LINE RETAINER
3 Claims, 8 Drawing Figs.

[52] U.S. Cl. .................................................. 43/25,
24/81, 24/257, 24/259, 43/43.12
[51] Int. Cl. ...................................................... A01k 87/00
[50] Field of Search ............................................ 43/25, 25.2,
43.12, 44.88; 24/257, 261.4, 81 B, 81 CC, 259

[56] References Cited
UNITED STATES PATENTS
| | | | |
|---|---|---|---|
| 664,889 | 1/1901 | Ogimura | 43/25 |
| 2,251,744 | 8/1941 | Kurath et al. | 24/259 |
| 2,257,415 | 9/1941 | Gerdin | 43/44.88 |
| 2,650,448 | 9/1953 | Lichtig | 43/25 |
| 2,763,083 | 9/1956 | Lenz | 43/25.2 |

*Primary Examiner*—Samuel Koren
*Assistant Examiner*—Daniel J. Leach
*Attorney*—C. Hercus Just ABSTRACT: A fishing line retainer comprising support means of several types attachable to a fishing rod between the reel and the line guide nearest the reel, the support means having line clamping means exerting very light, limited friction upon the line to retain the same in a wide obtuse angle between said reel and guide, whereby the drag imposed upon the outer end of the line extending into a moving stream will not remove the line from the clamping means, but the force exerted by a fish upon the line is adequate to pull the line from the clamping means and thus prevent a fish from pulling the fishing rod from supporting means therefor.

PATENTED JUN 1 1971 3,581,428
INVENTOR
WARREN W. HELDER
BY
ATTORNEY
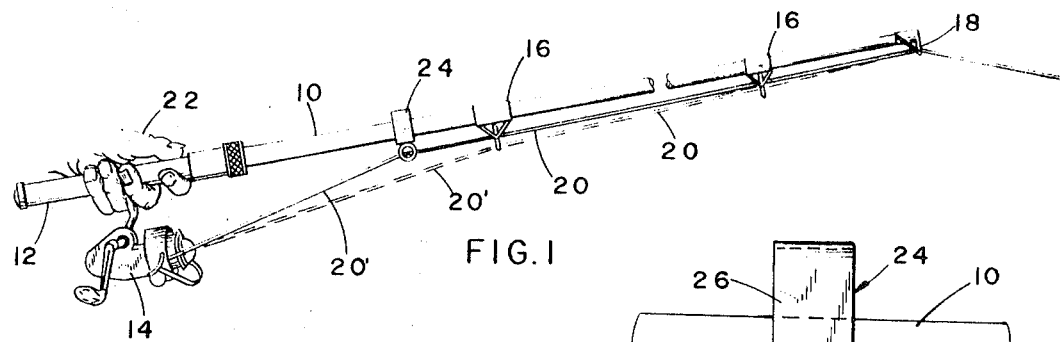
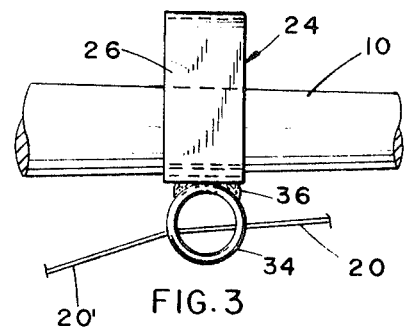
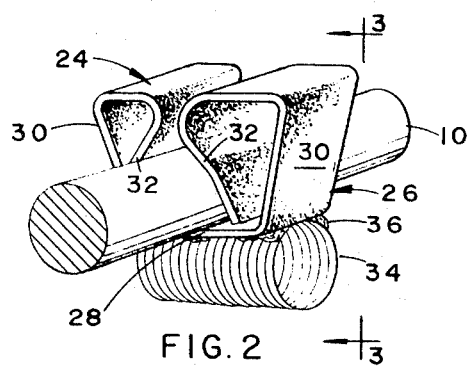
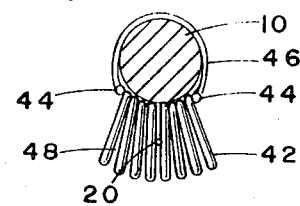
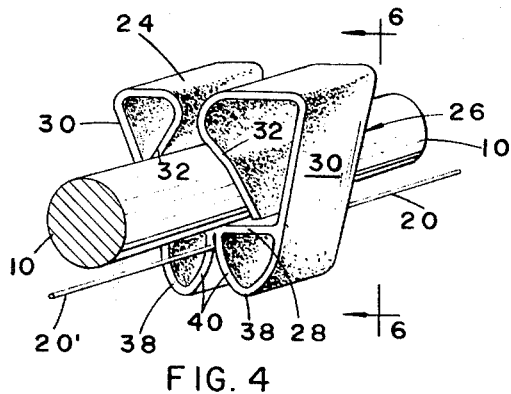
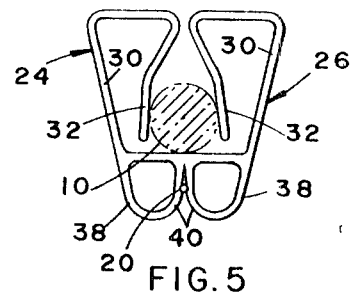
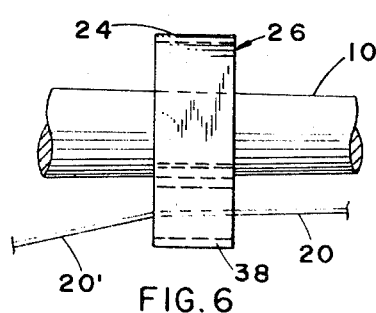
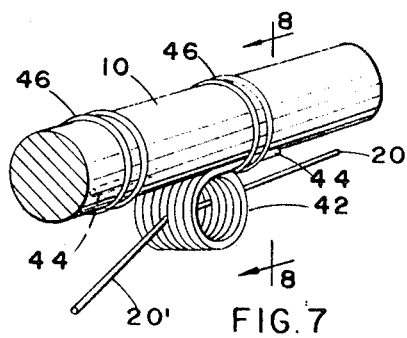

FISHING LINE RETAINER

BACKGROUND OF THE INVENTION

One very popular form of fishing is to support a fishing rod on suitable means, either upon a boat, wharf, or bank of a stream, with the hook end of a line and/or sinker, float, etc., extending into a body of water or floating thereon. Particularly under circumstances where the line is coiled upon a reel having either very light braking action or substantially no braking action, which is notably the situation found in so-called spinning reels, it is possible for the mere flow of a stream to carry the line downstream unless suitable braking upon the line is exercised.

Under circumstances where a conventional brake is applied to the reel or otherwise upon the line to prevent the stream from carrying the line downstream, it is possible when a fish "takes" the line, such as by being hooked on the outer end thereof, especially if the fish is of suitable size and vigorous, the entire fishing rod, reel, etc., can be pulled from its support and many fishing rods have been lost in this manner.

Certain previous attempts have been made to prevent undesired unreeling of the fishing line from a reel on a fishing rod until a fish actually "takes" the line, whereupon the line is released for such purposes. One such patent disclosing a device intended to accomplish this is U.S. Pat. No. 2,650,448, Lichtig, dated Sept. 1, 1953. Another more elaborate structure is shown in U.S. Pat. No. 2,640,290, Ames et al., dated June 2, 1953. In regard to the Lichtig patent, it is the intention that substantial braking action will be imposed upon the line, such as by rotating the supporting member with respect to the fishing rod so as to impose an appreciable amount of friction between the line and the holding means, thereby enabling the fishing rod to be simply held by a fisherman while a boat is trolling, the line being released only when a fish is hooked and attempts to pull the line away from the reel. The Ames et al. structure is a relatively complex and correspondingly expensive arrangement which, in addition to holding the fishing line against ready withdrawal, also includes means to impart a jerking motion thereon as soon as the fish strikes the hook, thereby attempting to set the hook in the jaw of a fish.

SUMMARY OF THE INVENTION

It is the principal objective of the present invention to provide several embodiments of fishing line retaining means comprising two principal elements, one element being a support means attachable either permanently or adjustably at a desired position upon a fishing rod, and the other element being a line clamping means supported thereby and being capable of exerting only very light frictional clamping force upon a line which is only sufficient to resist the line being pulled away from the reel by the action of a flowing current in a stream, for example, but readily capable of instantly releasing the line when a fish takes the line by engaging the hook and swimming away so as to readily pull the line away from the reel until the fisherman becomes aware of the situation and handles the rod and line appropriately to catch the fish.

It is another object of the invention to provide several embodiments of said fishing line retainers which are simple and inexpensive, while being foolproof and easy to operate.

A still further object of the invention is to provide one embodiment of fishing line retainer having a substantially U-shaped support means adapted to be resiliently clipped upon a fishing rod intermediately between the reel and line guide nearest the reel, said support means having a helical spring of limited length, and capable of exerting only very light pressure, fixed to said supporting means permanently and adapted to receive a fishing line between a pair of adjacent coils of said spring for light retention thereby, said support means preferably being formed from flexible synthetic resin.

It is still another object of the invention to provide an embodiment permanently connectable to a fishing rod and in which the clamping means comprises a coil spring of the type referred to above but secured directly against one surface of a fishing rod by bindings wrapped respectively around the rod and the projecting ends of said length of coil spring, thereby tending to slightly separate the opposite sides of the coils of the spring to facilitate reception of a fishing line between a pair of adjacent coils.

It is a still further object of the invention to provide a further embodiment preferably of a unitary nature formed from synthetic resin and including substantially U-shaped support means arranged to be clipped upon a fishing rod and including a pair of preferably hollow lobes provided with adjacent faces diverging at a very acute angle from each other to provide a sharp angular crevice therebetween to receive a fishing line with light frictional contact to permit ready release thereof from said clamping means.

BRIEF DESCRIPTION OF THE DRAWING

FIG. 1 is a perspective view of an exemplary fishing rod, broken away to foreshorten the same, and illustrating thereon fishing-line-retaining means which embodies the invention.

FIG. 2 is a perspective view of one embodiment of line-retaining means illustrated on a larger scale than in FIG. 1 and showing the same mounted upon a fragmentary portion of a fishing rod.

FIG. 3 is a side elevation of the embodiment of line-retaining means shown in FIG. 2 as seen on the line 3—3 thereof.

FIG. 4 is a perspective view similar to FIG. 2 but illustrating another embodiment of line-retaining means incorporating the principles of the invention.

FIG. 5 is an end view of the embodiment shown in FIG. 4.

FIG. 6 is a side elevation of the embodiment shown in FIGS. 4 and 5 as seen on the line 6—6 of FIG. 4.

FIG. 7 is a perspective view similar to FIGS. 2 and 4 but illustrating still another embodiment of line-retaining means which includes the principles of the invention.

FIG. 8 is a transverse sectional view of the embodiment shown in FIG. 7 as seen on the line 8—8 thereof.

DESCRIPTION OF THE PREFERRED EMBODIMENTS

Referring to FIG. 1, an exemplary fishing rod 10 is shown therein having a handle grip 12, a reel 14 connected thereto by conventional means, a plurality of line guides 16, and a tip or end guide 18, an exemplary fishing line 20 also being illustrated as extending from the reel 14 and through the guides 16 and 18. Although the rod is illustrated in FIG. 1 as being supported in a hand 22 of a fisherman, the present invention primarily is concerned with situations where the rod 10 is supported in a suitable holder or bracket of which many commercial, as well as improvised, types are available. Such holding means may even be in the form of a forked stick pushed into the soil of a bank of a stream, or any of such holders also being arranged at any appropriate location on a boat which is anchored, for example, or drifting in a flowing stream. Frequently, the rod and reel are merely laid on the bank of a body of water or stream.

From FIG. 1, it readily can be visualized that, particularly when the reel comprises a spinning reel 14 of the type shown in exemplary manner in FIG. 1, and no brake of any kind is being used, it is possible for the current of a flowing stream to pull the outer end of the line 10 downstream and thus accidentally pay out more of the line than is desired. Normally, it is preferred that the line not be pulled from the reel until a fish takes the hook. To prevent accidental or unintentional paying out of the line when, for example, the current of a stream attempts to do so, the present invention provides a plurality of embodiments of line-retaining means connectable at a desired location to the fishing rod 10, preferably between the reel 14 and the line guide 16 nearest the same. One embodiment of line-retaining means 24 is illustrated in an exemplary operative position upon the rod 10, it being intended that such position will be an exemplary illustration of a suitable position for all of the embodiments of line-retaining means illustrated successively in the additional figures of the drawing.

When the line-retaining means 24 is in the exemplary position illustrated in FIG. 1, it will be seen that the portion 20' of the line extending between the reel 14 and the retaining means 24 is at a very wide, obtuse angle to the portion of the line extending between the retaining means 24 and the line guide 16. Were it not for the line being lightly clamped by the retaining means 24, the portion of the line just referred to would be disposed substantially in the straight, dotted line position thereof shown in FIG. 1 and in which the line is substantially taut between the reel 14 and the nearest line guide 16.

Referring to FIGS. 2 and 3, the embodiment of line-retaining means 24 illustrated in exemplary manner in FIG. 1 is shown in detail in said figures. This embodiment comprises support means 26 which is formed from a strip of flexible or pliable material such as suitable synthetic resin. The resin should be selected from appropriate commercial varieties so as to permit the support means 26 to be formed by injection molding, for example. The resin permits the support means 26 to flex without breakage, yet engage the fishing rod 10 firmly, holding the support means against accidental removal at a desired position upon the rod. If desired, the support means 26 may be formed from a strip of spring metal stock of appropriate width and thickness, and preferably of a noncorrodable alloy.

From FIG. 2, it will be seen that the support means 26 is substantially U-shaped. The bight portion 28 is relatively flat and the side finger portions 30 extend upwardly, away from the bight portion 28 and preferably diverge outwardly from each other. The terminal end portions 32 are reversely bent upon themselves and extend downwardly toward the bight portion 28 and away from each other for firm, frictional engagement with opposed surface portions of the rod 10. As a result, the rod is actually gripped at three locations, two of these being by the inwardly directed terminal ends 32 and the other by the bight portion 28 of the support means 26. Such supporting means is readily snapped upon the rod 10 at any desired location and may be adjusted either rotatably about the axis of the rod or longitudinally thereof, as desired.

Support means 26 is provided for purposes of effectively and accurately positioning line-clamping means 34 which, in the instant embodiment, comprises a helical spring formed from light gauge spring wire, preferably of a noncorrodable alloy such as stainless steel or the like. The spring is of limited length. Actually only a few coils of said spring are necessary but, by providing the number illustrated in exemplary manner in FIG. 2, the line 20 may be disposed between an adjacent pair of such coils at any location upon the spring and thus make it unnecessary to be very accurate in disposing the line between such pair of coils.

The line clamping means 34 may be permanently attached to the support means 26 by appropriate cement 36. An appropriate epoxy or other suitable adhesive or cement is used for such purpose. Numerous commercial varieties are available. By referring to FIG. 3, it will be seen that the line 20 need only be partially inserted between an adjacent pair of coils of the clamping means 34. Actually, the line need not be inserted between such pair of coils to the depth shown in FIG. 3. For example, by just barely inserting the line between the outermost portions of a pair of adjacent coils, only a very light pressure will be exerted upon the line, whereby when a fish pulls on the line, such pull will quickly detach the line from the clamping means and thereby permit the fish to run with the line until the fisherman becomes aware of the situation and exercises appropriate action to catch the fish.

Another embodiment of the invention is illustrated in FIGS. 4—6, similar principles to those employed in the preceding embodiment also being present in the additional embodiment of the latter figures. Rather than employing a helical spring as in FIGS. 2 and 3, the embodiment in FIGS. 4—6 may be formed entirely from synthetic resin of appropriate type, such as by injection molding or the like. In said embodiment, the support means 26 is substantially the same as that illustrated in FIGS. 2 and 3, whereby similar reference characters to those in FIG. 2 have been used in FIGS. 4 and 5 and the detailed description thereof is not repeated, reference being directed to the foregoing description pertaining to FIG. 2.

Referring to FIG. 4, it will be seen that a pair of hollow lobes 38 are integrally molded relative to the bight portion 28. Said lobes are immediately adjacent each other as can best be seen from FIG. 5. Said lobes have limited flexibility and the adjacent portions thereof comprise diverging sides 40 which subtend a very sharply acute angle of only several degrees so as to be capable of engaging the fishing line 20 therebetween with very light friction and thus prevent the line from being accidentally pulled from the reel by the flow of a current, yet readily permit disengagement of the line from the retaining means when a fish takes the hook and starts to swim away from the rod.

The degree of friction exerted by the surfaces 40 of the clamping means comprising lobes 38 depends substantially upon the force by which a fisherman disposes the line between the surfaces 40. By carefully inserting the line lightly, however, it is possible to accomplish the desired function recited above with respect to temporarily restraining the line against being pulled by the current of a stream, for example, yet release the same instantly upon a fish striking the line by "-taking" the hook.

Still another embodiment of line retainer means is illustrated in FIGS. 7 and 8 in which a helical torsion spring 42, similar to the spring shown in FIGS. 2 and 3, but preferably of a shorter length, such as the exemplary number of coils illustrated in FIG. 8, comprises the clamping means. The terminal ends 44 of the outermost coils, respectively, are shaped to extend tangentially in either the same or opposite directions, substantially within a common plane. Said ends are of reasonable length as shown in FIG. 7, the length being adequate to permit several convolutions of appropriate binding members 46 to be wrapped closely adjacent each other around the terminal ends 44 and the rod 10. Such binding members may be of the type commonly employed to secure line guides to a rod, but other suitable means may be used as long as they preferably are of the type by which the clamping means 42 may be permanently secured to the rod 10 at a desired location.

By referring to FIG. 8, it will be seen that the spring clamping means 42, when disposed against a cylindrical surface of the rod 10, will tend to slightly space the outer portions of the adjacent coils of the spring 42 so as to provide very sharply angled spaces 48 for the reception of the line 20 between a pair of adjacent coils. The angle subtended between a pair of adjacent coils is approximately only about a full degree but nevertheless is adequate to readily facilitate the placement of a line between a pair of adjacent coils and thereby permit light frictional engagement of the line by the helical spring clamping means 42 so that the same quickly may be removed therefrom as when a fish takes the hook on the line.

From the foregoing, it will be seen that the present invention provides a number of embodiments of very simple and inexpensive line retainer units or means attachable either by a snap-type clip or permanently to a fishing rod at a desired location between the reel and line guide nearest the reel. The principal objective of all of the embodiments is the same, namely, to very lightly retain a fishing line and prevent the further discharge of the line from a reel such as by the drag imposed upon the outer end of the line by the current of a stream in which the line is disposed, yet permit instantaneous release of the line from the retaining means when a fish takes the hook, thereby preventing a fish from pulling the pole and reel thereon into the stream, which action frequently results in complete loss of the entire fishing equipment.

I claim:

1. A fishing line retainer attachable to a fishing rod adjacent and forwardly of a reel thereon for support by said rod, said retainer comprising in combination, a U-shaped clamping support formed from a strip of flexible noncorrosive material, the ends of the fingers of said support being bent upon themselves to provide a pair of gripping members extending toward the bight of the U-shaped support and the terminal ends of said inwardly bent fingers diverging away from each other to provide with the bight of said support a three-point clamping arrangement engageable with a fishing pole when attached thereto, and a helical spring connected to the opposite surface of said bight portion of said support from the surface thereof engageable with a fishing pole, the convolutions of said spring being substantially parallel to the gripping surfaces of said fingers of said support and adapted to receive a fishing line between a pair of such convolutions and lightly grip the same adequately to resist a pull upon the line by flowing current of a stream but permit instantaneous disengagement of the line therefrom when a fish pulls a hook upon said line.

2. The fishing line according to claim 1 in which said clamping support is formed from a strip of elastic synthetic resin of substantially uniform width and thickness.

3. The fishing line according to claim 1 in which said helical spring is fixedly connected to said clamping support by cement.